Patented Oct. 22, 1929

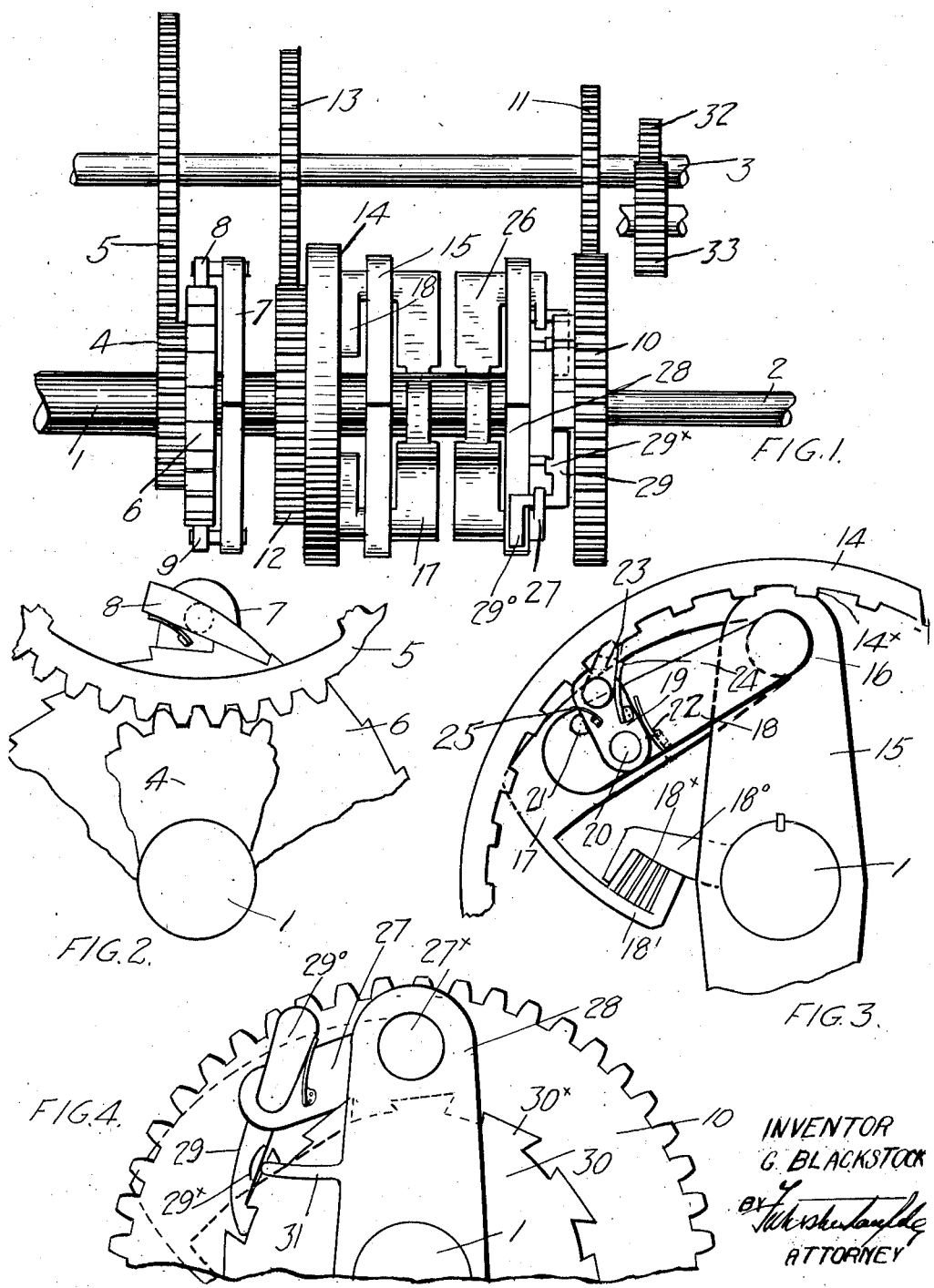

1,733,002

UNITED STATES PATENT OFFICE

GIBBS BLACKSTOCK, OF TORONTO, ONTARIO, CANADA

CHANGE-GEAR DEVICE

Application filed September 15, 1928, Serial No. 306,147, and in Canada March. 24, 1928.

My invention relates to improvements in change gear devices, and the object of the invention is to provide a machine of the type disclosed in my United States application Serial #262,434, filed March 17th, 1928, and my Canadian application #335,258, filed March 24th, 1928, which is adapted to provide three or more speeds and in which each change is made smoothly and evenly without jar, and it consists essentially of a drive and driven shaft, a counter shaft, a plurality of reduction gear trains between the drive and driven shaft and the counter shaft and means for automatically shifting the drive from any one gear train to another to form a driving connection between the drive and driven shafts as conditions require.

Fig. 1 is a plan view of my change speed gear.

Fig. 2 is a detail view of the engaging and releasing mechanisms for the low speed gear.

Fig. 3 is a similar view to Fig. 2 showing the engaging and releasing mechanism for the intermediate gear.

Fig. 4 is a similar view to Figs. 2 and 3 showing the engaging and releasing mechanism for the high speed gear.

In the drawings like characters of reference indicate corresponding parts in each figure.

The machine herein described is a three speed machine of ordinary motor car type and broadly differs from the construction described in the aforesaid copending application in providing a device suitable for intermediate drive between high and low speeds which is adapted when in the driving position to communicate the drive, or to slip if the engine is slowed, to be released by excessive load allowing the drive to pass to a lower gear train and to be reset in the driving position by the reduction of the speed of the engine slightly below that corresponding to operation in intermediate gear.

The change to a higher gear is effected by slowing the engine to a certain speed, and to a lower is automatically effected when the load becomes sufficient to force a revolving weight in an opposite direction to that effected by centrifugal action, or inward against centrifugal action.

1 indicates the drive shaft which rotates in a clockwise direction and 2 the driven shaft. I will first describe the low speed drive referring to Figures 1 and 2.

3 is a counter shaft. 4 and 5 are intermeshing gears forming a low speed drive between the drive shaft 1 and the counter shaft 3. The gear 4 is freely mounted on the drive shaft and has a driving connection therewith by means of a ratchet wheel 6 formed integral with the gear 4, a cross arm 7 secured to the shaft 1 and carrying pawls 8 and 9 spring pressed against the ratchet wheel 6, which are balanced so that they do not fly off the teeth of the ratchet 6. The gear 5 is secured to the counter shaft 3.

10 is a gear secured to the driven shaft 2, and 11 is a gear meshing with the gear 10 and splined to the shaft 3.

The low speed drive is therefore, effected from the drive shaft 1, arm 7, pawls 8 and 9, ratchet wheel 6, gears 4 and 5, counter shaft 3 and gears 11 and 10 to the driven shaft 2.

The operation of the low gear is as follows:—The gear is driven by the dogs 8 and 9 carried by the arm 7 engaging the ratchet 6. When the drive is through the intermediate or through the high gear the engine speed is relatively slower than the ratchet and the dogs slip. When the intermediate gear is released the engine gains speed and when the speed of the rack is attained the pawls engage the ratchet to drive through the ratchet wheel 6.

I will now describe the intermediate gear mechanism referring to Figures 1 and 3.

12 is a gear freely mounted on the drive shaft 1. 13 is a gear secured to the counter shaft 3. 14 is an annular rack secured to the gear 12 and provided with square teeth $14^x$.

15 is a cross arm similar to the arm 7 and is secured to the driving shaft 1. 16 are short shafts journalled in each end of the cross arm 15. 17 is a weight secured to one end of each shaft 16. 18 is an arm secured to the opposite end of each shaft 16 and moving in unison with the weights 17, the return or outward movement of which due to centrifugal action is cushioned by the spring 18$^x$ held between the oppositely turned portions of the arms 18$^o$ and 18$^1$ carried respectively by the driving shaft 1 and weight 17.

The arms 18 form the main pawl bearing arms. 19 are supplemental pawl bearing arms pivotally mounted on the arms 18 as indicated at 20 and pressed against the stud 21 extending from the arm 18 by the spring 22. 23 is a pawl pivotally mounted on each end of the arm 19 spring held in engagement with the teeth 14$^x$ of the annular rack 14 by a spring 24 and in its reversed position as will hereinafter appear by the spring 25.

The intermediate gear operates as follows:—

The weight 17 is held outward by centrifugal action and maintains the arms 19 and pawl 23 in the driving position against the pressure of the rack 14 on the pawl which tends to force the arm 18 inward, the stud 21 holding the arm 19 from movement.

If the engine is slowed to engage the high gear pawl hereinafter described the pawl 23 slips. When the high gear device is released the engine gains speed until the pawl 23 catches up with and attains the speed of the rack 14 when the drive therebetween immediately commences through the intermediate gear train. As this occurs just when the engine is going at the right speed for intermediate gear operation there is no shock or lurch as there is no sudden alteration of speed of car or engine.

When the load becomes sufficient to force the arm 18 and the weight 17 inward against centrifugal action, the inward swing of the arm 18 allows the pawl 23 to be carried over backward into the released position, the arm and weight swing out again and the pawl slips as the engine gains speed for the low gear drive.

The change from low to intermediate gear is effected by reducing the speed of the engine however slightly below that of the rack 14. The relative forward motion of the rack 14 then carries the pawl 23 over forward to the driving position, the arm 19 moving against the spring 22 and back, the main arm 18 and the weight 17 not being moved. The pawl 23 can then take the drive when the throttle is opened again.

Thus the change from the low to intermediate gear is effected by the momentary slowing of the engine slightly below the speed corresponding to operation in intermediate gear, while the change from intermediate to low occurs when the load is great enough to force the weight inward against the centrifugal force due to its revolution. Since the centrifugal force increases as the square of the speed it is evident that much greater loads are required to effect a change at higher speed.

I will now describe the high speed gear mechanism referring to Figures 1 and 4.

26 are weights similar in construction to the weight 17 and 27 are arms constructed similar to the arms 18 and similarly related to the weights 26. 28 are cross arms secured to the drive shaft and on which the arms 27 are pivoted at 27$^x$, similar to the arms 7 and 15. 29 is a pawl carried on each of the arms 27 and is carried around at engine speed and as long as the centrifugal force of the weight is great enough to hold the secured arm 27 in the outward position the pawl 29 locks the rack 30$^x$ of the wheel 30 secured to the gear 10 and hence the driven shaft so that the latter revolves at engine or high speed.

31 is a finger secured to the arm 28. 29$^x$ is a flange extending out from the pawl 29 in the path of the finger 31. The pawl 29 is a balanced pawl so that it does not fly free from the teeth engaging therewith. The pawl 29 is pivotally mounted in the arm 27 and is provided with a weighted spring pressed end 29$^o$. When the load is great enough the pull of the pawl on the arm 27 causes it and the weight to swing inward a few degrees.

The flange 29$^x$ on the pawl then contacts with the finger 31 on the arm 28 and the pawl is levered out of the notch of the rack 30$^x$, the arm 27 and the weight 26 swing out again. The engine momentarily freed from the load gains speed (to resume the drive in the intermediate gear train) and as the notches of the rack 30$^x$ are large enough to admit the pawl only when it is pressed radially inward with respect to the wheel 30, the relative angular motion of the pawl 29 due to its increased speed causes it to pass over the peripheral faces of the teeth of the rack 30$^x$ without falling into a notch.

When the speed of the driving shaft is reduced so that there is practically no difference between that of the notches and the pawl the latter is pressed into a notch where it remains. Thus the change from intermediate to high gear is effected by slowing the speed of the driving shaft to that of the driven shaft.

If the engine is throttled or shut off the pawl 29 will not slip like the pawls 8, 9 and 23 but the engine will be driven by the car, acting as a brake. The device described for the intermediate gear may be used for the high gear, the car will then coast if the engine is shut off but the latter will not act as a brake.

32 and 33 are the reversing gears. The gears 11 and 32 are splined to their shafts.

In order to reverse the drive the gear 11 is moved manually out of engagement with the gear 10 and the gears 32 and 33 moved so that the gear 33 engages the gear 10.

As there is no centrifugal force at the start the intermediate and high gear pawls are released when the drive shaft begins to revolve. The drive is then through the gear 4 and the countershaft 3 and the gears 32 and 33 and 10 which is part of the driven shaft. It is obvious that the driven shaft will then revolve backward. The high gear pawl 29 moving forward slips over the rack 30ˣ which moves backward. The second gear pawl 23 may be thrown into the driving position in the usual manner.

It will of course be understood that the number of intermediate gears need not be limited to one and any additional releasable driving device similar to that described for the intermediate gear.

If the weights 17 are each made integral with the adjacent weight 26, which can be done as their respective pivot shafts are aligned, then there will be only one pair of weights for both the high and intermediate gear connections. The intermediate pawl carrier will then swing inward when the high gear pawl is released. If the carrier swings out again before it has overtaken the rack 14 the pawl 23 will be ready to take the drive, if not, then as can be seen from Figure 3, the pawl will be turned over into the backward or released position and the drive pass from high to low gear. The time for the outward swing depends on the speed (and centrifugal force) and the time for the drive shaft to overtake the rack 14 depends on the torque exerted by the engine, if the throttle is opend wide at low speeds the drive may thus pass direct from high to low gear.

The quantitative relations of torque and speed need not be discussed here, but in general, the outward acceleration of the weights and pawl arms will be very rapid in comparison with the angular acceleration of drive shaft.

It will be understood that by proper choice of weights and other dimensions a machine can be designed which will change gear just when a good operator will desire to do so but in an essentially automatic manner.

When rapid acceleration from low speed is required the low centrifugal force accompanying low speed and the high torque due to opening the throttle will generally cause a change to lower gear thus giving more power without loss of time or attention. The change to higher gear after sufficient speed has been attained is effected in a momentary closing of the throttle after which the machine will operate in higher gear owing to the greatly increased centrifugal force which accompanies increased speed.

It will be seen that when the trouble of changing gears manually is eliminated the changes may conveniently be much more frequent so that a smaller engine may be used. The large engines now in vogue owe their popularity chiefly to the demand for acceleration and hill-climbing power to save the trouble of changing gear.

The device above described offers advantages over many proposed power transmissions and automatic gear devices in that it has no oscillating parts to give vibration, will give no shock and lurch in changing gear, and in that the releasable devices either allow free frictionless slip or positively no slip at all as conditions demand.

It will of course be understood that my device may be applied to other uses than in a motor car and is capable of being used in any case in which the driven part is able to maintain its speed momentarily by virtue of its momentum while the driving part is slowed to throw the higher gear train into driving condition.

It may be pointed out what the essential principles involved in the intermediate device are, that it is essentially a releasable link in a train of gears and has the following properties:—

(a) It is held in engagement by centrifugal action of a revolving weight to which it is operably connected or secured.

(b) Allows free slip if the engine is slowed.

(c) Is released when the load is great enough to force the weight inward against centrifugal action.

(d) Is reset in driving position by momentary reduction of engine speed slightly below that corresponding to operation through the related gear train, and (e) Allows as conditions demand either no slip at all, or free slip without friction.

It will therefore be understood that the particular method of carrying the weight as that illustrated in Fig. 3 is not essential so long as the weight revolves and it is carried in an outward position by centrifugal action and is capable of some inward movement.

It may also be pointed out that the purpose of the supplemental pawl arm 19 is to permit the pivot of the pawl 23 to move away from the rack 14 without disturbing the weight so that the point of the pawl may be carried over from backward to forward driving position without offering resistance. Hence any other method of carrying the pin of the pawl 23 is in principle the same as long as the pawl cannot move out of the forward driving position without forcing the weight inward, but can move in the reverse direction without moving the weight.

What I claim as my invention is:—

1. In a change speed device, the combination with the drive and driven shafts, of a pair of revolvable members freely carried on the driving shaft and forming respectively a member of a low and an intermediate gear drive between the shafts, a revolvable member secured to the driven shaft and forming part of a high gear drive between the shafts, interconnected gear trains between the low and intermediate gear members and the high gear member, an intermediate gear driving device secured to the drive shaft, an annular engaging face formed on the aforesaid freely carried intermediate gear drive member and with which the intermediate gear driving device has slipping engagement when the speed of the drive shaft is increased or reduced above or below the speed of the intermediate member and to have driving engagement when the speed of the drive shaft equals the speed of the intermediate member, a high gear driving device secured to the drive shaft, an annular engaging face formed on the aforesaid revolvable member secured to the driven shaft and with which the high gear driving device engages when the speed of the drive shaft decreases to the speed of the driven shaft and to release when the speed of the driven shaft decreases below the speed of the drive shaft, and a low gear driving device secured to the driving shaft, an annular engaging face formed on the aforesaid freely carried low gear drive member and with which the low gear drive shaft engages when the speed of the drive shaft is increased above the speed of the intermediate member.

2. In a change speed device, the combination with the drive and driven shafts, of a pair of annular racks freely carried on the drive shaft and forming respectively an element of the low and intermediate gear drive between the drive and driven shafts, an annular rack secured to the driven shaft and forming an element of the high gear drive, interconnected trains of gear between the low and intermediate gear racks and the high gear rack, a pawl carrier secured to the drive shaft adjacent each rack, a pawl pivotally mounted on the intermediate carrier normally engaging the intermediate rack in a forward driving position and adapted to be swung on its pivot to a reverse position as the pivot point is advanced in the direction of travel of the drive shaft past the radial position of the pawl point by relative increase of the speed of the drive shaft above the speed of the intermediate rack due to load increase and to be reset as the aforesaid pivot point is receded in relation to the direction of travel of the drive shaft and into the forward driving position as the speed of the drive shaft is reduced below that of the rack, a pawl carried by the low gear carrier adapted to be carried into driving engagement with the low gear rack to pick up the load released by the reversal of the intermediate pawl when the speed of the drive shaft is increased as aforesaid above the speed of the intermediate rack, a pawl pivotally mounted on the high gear carrier adapted to engage the high gear rack when the speed of the driving shaft is equal to the speed of the high gear rack, means for releasing the pawl actuated by the decrease in speed of the high gear rack by the load below the driving shaft speed greater than the intermediate rack to permit the intermediate pawl and rack to engage and pick up the load.

3. In a change speed device, the combination with the drive and driven shafts, of a pair of revolvable members freely carried on the drive shaft and forming respectively a member of a low and intermediate gear drive between the shafts, a revolvable member secured to the driven shaft and forming part of the high gear drive between the shafts, interconnected gear trains between the low and intermediate gear members and the high gear member, a driving device for the intermediate member secured to the drive shaft and in engagement by centrifugal action and adapted to slip when the speed of the drive shaft is reduced below and increased above the speed of the intermediate member, means for holding the intermediate driving device in engagement by centrifugal action releasable by excessive load, a driving device carried on the drive shaft to engage the high gear member when the speed of the drive shaft is reduced to that of the driven shaft, means for holding the high gear driving device in engagement operated by centrifugal action, means actuated by the load for releasing the high gear driving device against centrifugal action, and a driving device for the low speed member adapted to engage when the speed of the drive shaft is increased above the speed of the intermediate member.

4. In a change speed device of the type described, the combination with the drive and driven shafts and an intermediate gear train therebetween, of a driving connection between such train and the drive shaft and comprising an annular rack connected to revolve with one of the elements of the gear train, a carrier secured to the drive shaft, a movable weight carried on the carrier, a pivoted pawl engaging the rack, means for mounting the pawl to move in unison with the weight to swing to the reverse released position in relation to the rack as the weight moves inward and the speed of the rack becomes less than that of the drive shaft owing to excessive load and to return freely to the driving position independently of the outward pressure of the weight as the speed of the drive shaft is reduced below that of the rack, said pawl being also adapted when in driving position to slip if the speed of the drive shaft is maintained below that of the rack.

5. In a change speed device of the type described, the combination with the drive and driven shafts and the intermediate gear train therebetween, of a driving connection between such train and the drive shaft and comprising an annular rack connected to revolve with one of the elements of the gear train, a carrier member secured to the drive shaft, a movable weight carried on the carrier, a spring pressed arm movable with the weight and pivotally mounted at one end and adapted to be forced inward against spring pressure, a stop limiting the reverse movement of the arm, a spring pressed pawl pivotally mounted at the other end of the arm and held in the forward rack engaging position by the weight held outward by centrifugal action and carried to the reverse or released position as the weight is forced inward and the speed of the rack becomes less than that of the drive shaft owing to its excessive load, and to return freely independently of the outward pressure of the weight as the speed of the drive shaft is reduced below that of the rack, such pawl being also adapted when in the driving position to slip if the speed of the drive shaft is maintained below that of the rack.

6. In a change speed device of the type described, the combination with the drive and driven shafts and intermediate gear connection, of a high speed gear connection comprising a rack carried by the driven shaft, a carrier secured to the drive shaft, a movable weight carried by the carried, a pawl connected to the weight and adapted to engage the rack, means for holding the pawl in engagement with the rack while the weight is held outward by centrifugal force, means for disengaging the pawl from the rack actuated by inward movement of the weight due to excessive load on the driven shaft, means for forming an intermediate gear drive connection between the drive and driven shafts when the high gear rack is free, means for preventing the re-engagement of the pawl when the speed of the drive shaft is greater than that of the rack and permitting the re-engagement of the pawl when the speed of the drive shaft is reduced to that of the driven shaft.

7. In a change speed device of the type described, the combination with the drive and driven shafts and intermediate gear connection, of a rack carried by the driven shaft and having the outer face of each tooth inclined so that the forward end of the tooth is of greater radial distance from the centre of the shaft than the rear end of the next tooth, a pawl carrier carried by the drive shaft, a spring pressed pawl carried by the carrier and engaging between the teeth of the rack in its high speed position, means for holding the pawl in engagement with the rack, means for disengaging the pawl from the rack by excessive load on the drive shaft to permit the drive shaft speed to increase when so released and to permit the pawl to travel freely around the periphery of the rack, said pawl and rack being adapted to reengage when the speed of the rack and pawl carried by the driven and drive shafts respectively is equalized.

8. In a change speed device of the type described, the combination with the drive and driven shafts and intermediate gear connection, of a rack carried by the drive shaft having the outer face of each tooth inclined so that the forward end of the tooth is of greater radial distance from the centre of the shaft than the adjacent rear end of the next tooth, a carrier secured to the drive shaft, a spring pressed pawl carried by the carrier and engaging the rack when the speed of the drive shaft is decreased to that of the driven shaft and releasing the rack when the speed of the driven shaft is decreased below the speed of the driving shaft, a movable weight carried on the carrier to revolve therewith and to which the aforesaid pawl is connected, an arm extending from the carrier adjacent the pawl and with which the pawl is carried into engagement by the inward movement of the weight due to excessive load on the drive shaft to carry the pawl out of engagement with the rack, said pawl being adapted to return into engagement when the speed of the drive shaft is reduced to that of the rack.

9. In a change gear device, the combination with a drive and a driven shaft and low, intermediate and high gear trains therebetween, of a releasable connection in each of the gear trains, each connection comprising adjacent driving and driven members connected respectively with the drive and driven shafts, and an interposed locking member adapted to engage when the driving and driven members are brought to approximately the same speed, means for the release of the low and means for the release of the intermediate gear locking members actuated by retardation of drive shaft, means actuated by the load for releasing the locking members of the high and intermediate gear connections, each of such means comprising a weight carried by the device to revolve around a centre of motion in the device and so mounted as to be subject to centrifugal force and inward force due to load and to assume an outward or inward position as one or other of the forces preponderates, and means coacting with the inward motion of the weight for releasing the related locking member.

10. In a change gear device, the combination with a drive and a driven shaft and low, intermediate and high gear trains therebetween, of a releasable connection in each of the gear trains, each connection comprising adjacent driving and driven members connected respectively with the drive and driven shafts, and an interposed locking member to releasably lock them together, means actuated by the increase of the speed of the driving member to that of the driven member for effecting the engagement of the low, means similarly actuated for effecting the engagement of the intermediate locking member, and means actuated by retardation of the driving member below the speed of the driven member for releasing the low, means similarly actuated for releasing the intermediate gear locking member, and means for releasing the intermediate gear connection including a weight carried by the device to revolve with one of the elements of the gear train and so mounted as to be subject to centrifugal force and inward force due to load and to assume an outward or inward position as one or other of the forces preponderates, and means coacting with inward motion of the weight for releasing the locking member of the intermediate gear connection, means actuated by equalizing the speed of the driving and driven members of the high gear connection for causing the engagement of the related locking member, and means for releasing the high gear connection including a weight carried by the device to revolve with one of the elements of the gear train and so mounted as to be subject to centrifugal force and inward force due to load and to assume an outward or inward position as one or other of the forces preponderates, and means coacting with the inward motion of the weight for releasing the locking member.

11. In a change speed device of the type described, the combination with a drive and driven shaft and an intermediate gear drive, of members of a high gear drive, and a releasable connection incorporated therein comprising a driving member driven from the drive shaft and a driven member releasably connected to the driving member to transmit motion from the driving member to the driven shaft and an interposed locking member connecting the drive and driven members together, a movable weight adapted to revolve with one of the elements of the high gear drive and connected with the locking member, means for holding the locking member in engagement while the weight is held outward by centrifugal action, means for disengaging the locking member actuated by the inward movement of the weight due to excessive load on the drive shaft, means for forming an intermediate gear drive connection when the high gear connection is released, means for preventing the re-engagement of the high gear locking member when the speed of the driving member is greater than that of the driven member and permitting the re-engagement of the locking member when the speed of the driving member is reduced to that of the driven member.

12. In a change gear device of the type described, the combination with a drive and driven shaft, and an intermediate gear train therebetween, of a driving connection incorporated in such gear train, such driving connection comprising a driving member driven from the drive shaft, a driven member releasably connected to the drive member to transmit motion from the driving member to the driven shaft, an interposed locking member to lock such driving and driven members together, a movable weight adapted to revolve with one of the elements of the gear train and coacting with the locking member, means for disengaging the locking member actuated by inward movement of the weight due to excessive load on the drive shaft, means for forming a low gear connection when the intermediate gear connection is thus released, such locking member being also adapted when in engaged condition to disengage and slip if the speed of the driving member is maintained below that of the driven member and to re-engage whenever the driving member after being reduced in speed below that of the driven member overtakes the latter.

GIBBS BLACKSTOCK.